H. G. CARLSON.
HANGER BLOCK.
APPLICATION FILED JAN. 4, 1909.
984,647.
Patented Feb. 21, 1911.
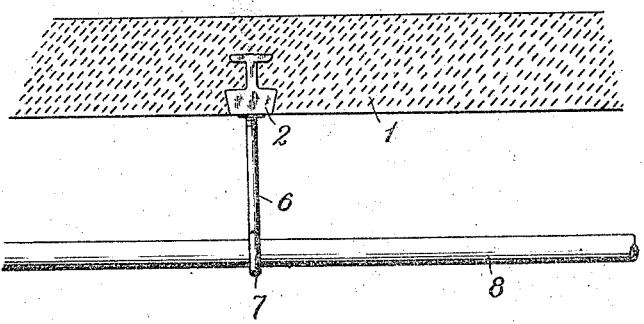
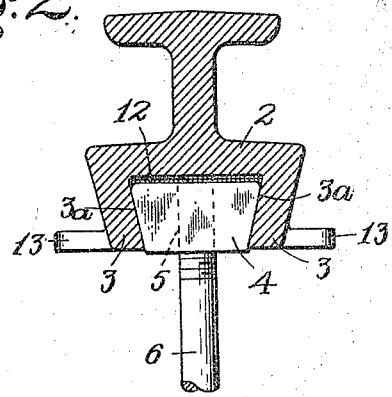
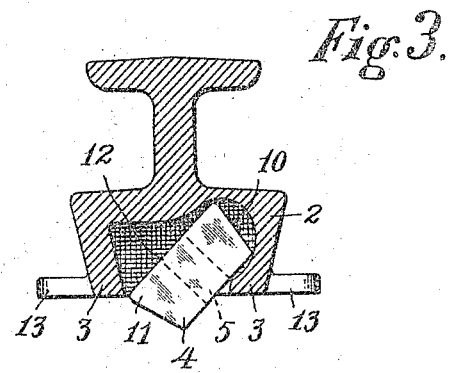
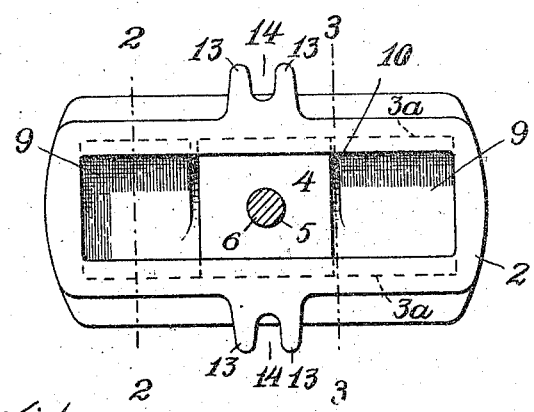
Witnesses.
R. O. Tolman
Penelope Comberbach
Inventor
Hjalmar G. Carlson.
By Rufus B. Fowler
Attorney

UNITED STATES PATENT OFFICE.

HJALMAR G. CARLSON, OF WORCESTER, MASSACHUSETTS, ASSIGNOR TO WORCESTER FIRE EXTINGUISHER COMPANY, OF WORCESTER, MASSACHUSETTS, A CORPORATION OF MASSACHUSETTS.

HANGER-BLOCK.

984,647.  Specification of Letters Patent.  Patented Feb. 21, 1911.

Application filed January 4, 1909. Serial No. 470,722.

*To all whom it may concern:*

Be it known that I, HJALMAR G. CARLSON, a citizen of the United States, residing at Worcester, in the county of Worcester and Commonwealth of Massachusetts, have invented a new and useful Improvement in Hanger-Blocks, of which the following is a specification accompanied by drawings, forming a part of the same, in which—

Figure 1 shows my improved hanger block in position and a pipe suspended therefrom. Fig. 2 is a section of my improved hanger block on line 2—2, Fig. 4. Fig. 3 is a section on line 3—3, Fig. 4. Fig. 4 is a bottom view of my improved block.

Similar reference figures refer to similar parts in the different views.

My invention relates to hanger blocks arranged to afford means of support from a horizontal surface of cement or similar material and to be embedded in the cement while it is still plastic, and it consists in the construction and arrangement of parts as hereinafter described and pointed out in the annexed claim.

Referring to the accompanying drawings, 1 is a cement ceiling, 2 is a hanger block embedded therein, the lower portion of which is provided with lips 3 forming ways 3ª, between which is supported a beveled nut 4 capable of sliding in said ways and having a screw threaded central opening 5, in which is inserted the screw threaded end of a rod 6, the other end of which is provided with a supporting eye 7 arranged, in the present instance, to support a pipe 8 as shown in Fig. 1. The nut 4 is arranged to slide in the ways 3ª to provide for the alinement of successive hangers when they are employed to support a single pipe. This construction of ways, a nut sliding in said ways, and a screw threaded rod is well known and forms no part of my invention.

The hanger block is usually constructed of cast metal and, in the ordinary block, the nut 4 is inserted in the opening 9 between the ways 3ª through one end thereof, which is left open for the purpose. This open end is afterward closed by a sheet metal plate, which is driven into the opening 9 and must fit therein with considerable accuracy. In my improved construction, I close both ends of the opening 9 between the ways 3ª when the cast metal block is made, and to provide for the insertion of the nut 4 I shape the opening 9 with a curved recess 10 at one side of the bottom, so that the nut when sufficiently inclined, as shown in Fig. 3, will enter the recess 10 and allow the corner 11 of the nut 4 to pass the beveled lip 3. The recess 10 may extend the entire length of the ways 3ª, or be but slightly wider than the nut, as shown. The semi-circular shape of the recess 10 allows the base 12 of the nut 4 to be brought parallel with the base of the opening 9 between the ways 3ª, and the nut 4 is held by the lips 3 against a vertical downward strain, as shown in Fig. 2. To remove the nut 4, it is inclined as shown in Fig. 3, when it will enter the recess 10 and the corner 11 will pass the lip 3.

In my improved construction, I am enabled to cast the both ends of the opening 9 integral with the lips 3, by which the necessity of inserting a metal plate is obviated. In the ordinary hanger block the lugs 13 are placed at diametrically opposite corners of the block, and are provided with holes by which the block is attached to the wooden frame used for receiving the cement in its plastic condition. In my improved block the lugs are brought directly opposite in the center of the block, so that I am enabled to employ lugs with slotted or V-shaped openings 14, which may be cast in the block, and the necessity of boring holes through the lugs 13 thereby obviated.

I claim,

A hanger block arranged to be inserted in cement construction and provided with lips on each side of said block converging downwardly and extending throughout the length of the block forming longitudinal supporting ways, a beveled nut of larger dimensions than the distance between the lower edges of said lips, with the beveled sides of said nut arranged to contact with the inside of said converging lips, and with a recess above and at one side of said longitudinal ways of a depth and width sufficient to allow the insertion of said nut in an inclined position between said lips.

Dated this first day of January 1909.

HJALMAR G. CARLSON.

Witnesses:
GEORGE I. ROCKWOOD,
JOHN P. ASHER, Jr.